United States Patent [19]
Nakadouzono et al.

[11] Patent Number: 5,377,639
[45] Date of Patent: Jan. 3, 1995

[54] VARIABLE VALVE TIMING SYSTEM

[75] Inventors: Hiroyuki Nakadouzono, Anjo; Kongo Aoki, Toyota, both of Japan

[73] Assignee: Aisin Seiki Kabushiki Kaisha, Kariya, Japan

[21] Appl. No.: 187,721

[22] Filed: Jan. 28, 1994

[30] Foreign Application Priority Data

Jan. 29, 1993 [JP] Japan .................................. 5-13713

[51] Int. Cl.$^6$ ............................................. F01L 1/34
[52] U.S. Cl. ................................. 123/90.17; 123/90.31
[58] Field of Search ............... 123/90.15, 90.17, 90.31

[56] References Cited

U.S. PATENT DOCUMENTS

| | | | |
|---|---|---|---|
| 5,067,450 | 11/1991 | Kano et al. | |
| 5,080,052 | 1/1992 | Hotta et al. | 123/90.17 |
| 5,090,365 | 2/1992 | Hotta et al. | 123/90.17 |
| 5,205,248 | 4/1993 | Hara et al. | 123/90.17 |

*Primary Examiner*—E. Rollins Cross
*Assistant Examiner*—Weilun Lo
*Attorney, Agent, or Firm*—Oblon, Spivak, McClelland, Maier & Neustadt

[57] ABSTRACT

A variable valve timing system in an engine having a rotating cam-shaft includes an input pulley driven by the engine, a piston engaged with the input pulley so as to be displaceable in angular direction relative thereto, a cup-shaped casing mounted on the piston so as to be displaceable in angular direction relative thereto and connected to the cam-shaft, a cup-shaped cover accommodating therein the cup-shaped casing with a clearance and connected to the input pulley, a damper containing an amount of viscous fluid disposed in the clearance, a first sealing member disposed at one end of the clearnace, and a second sealing member disposed at the other end of the clearance, and having a characteristic in that a fluid-tight function between the cup-shaped cover and the cup-shaped casing becomes less as a centrifugal force increases.

9 Claims, 3 Drawing Sheets

VARIABLE VALVE TIMING SYSTEM

BACKGROUND OF THE INVENTION

The present invention relates to a variable timing system, and in particular to a variable timing system for use in an engine of a vehicle.

One of the conventional variable timing systems is disclosed in the U.S. Pat. No. 5,067,450. This system includes a first member driven by an engine, a second member rotatably connected to a crank shaft, and means for adjusting an angular relative displacement therebetween. in addition, a damper is interposed between the first and second members in order to avoid an angular position change of the second member relative to the first member when a torque variation is applied to the second member. The damper has a plurality of meshing labyrinth grooves on the first and second members and viscous fluid between the labyrinth grooves. In order to prevent a leakage of the viscous fluid a sealing member is interposed between the first and second members.

However, in the foregoing structure, the sealing member also acts as a friction between the first member and the second member which should be displaced in the angular direction when the variable timing system is in operation.

SUMMARY OF THE INVENTION

It is, therefore, a principal object of the present invention is to provide a variable timing system without the foregoing drawback.

Another object of the present invention is to provide a variable timing system in which both of a first member driven by an engine and a second member rotatably connected to a crank shaft are out of frictional engagement with a sealing member of a damper.

In order to attain the foregoing objects, a variable valve timing system in an engine having a rotating cam-shaft includes an input pulley driven by the engine, a piston engaged with the input pulley so as to be displaceable in angular direction relative thereto, a cup-shaped casing mounted on the piston so as to be displaceable in angular direction relative thereto and rotatably fixed to the cam-shaft, a cup-shaped cover accommodating therein the cup-shaped casing with a clearance and connected to the input pulley, a damper containing an amount of viscous fluid disposed in the clearance, a first sealing member disposed at one end of the clearance, and a second sealing member disposed at the other end of the clearance and having a characteristic in that a fluid-tight function between the cup-shaped cover and the cup-shaped casing becomes less as a centrifugal force increases.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF A PREFERRED EMBODIMENT

A preferred embodiment of the present invention will be described hereinunder in detail with reference to the accompnaying drawings.

Figure 1:
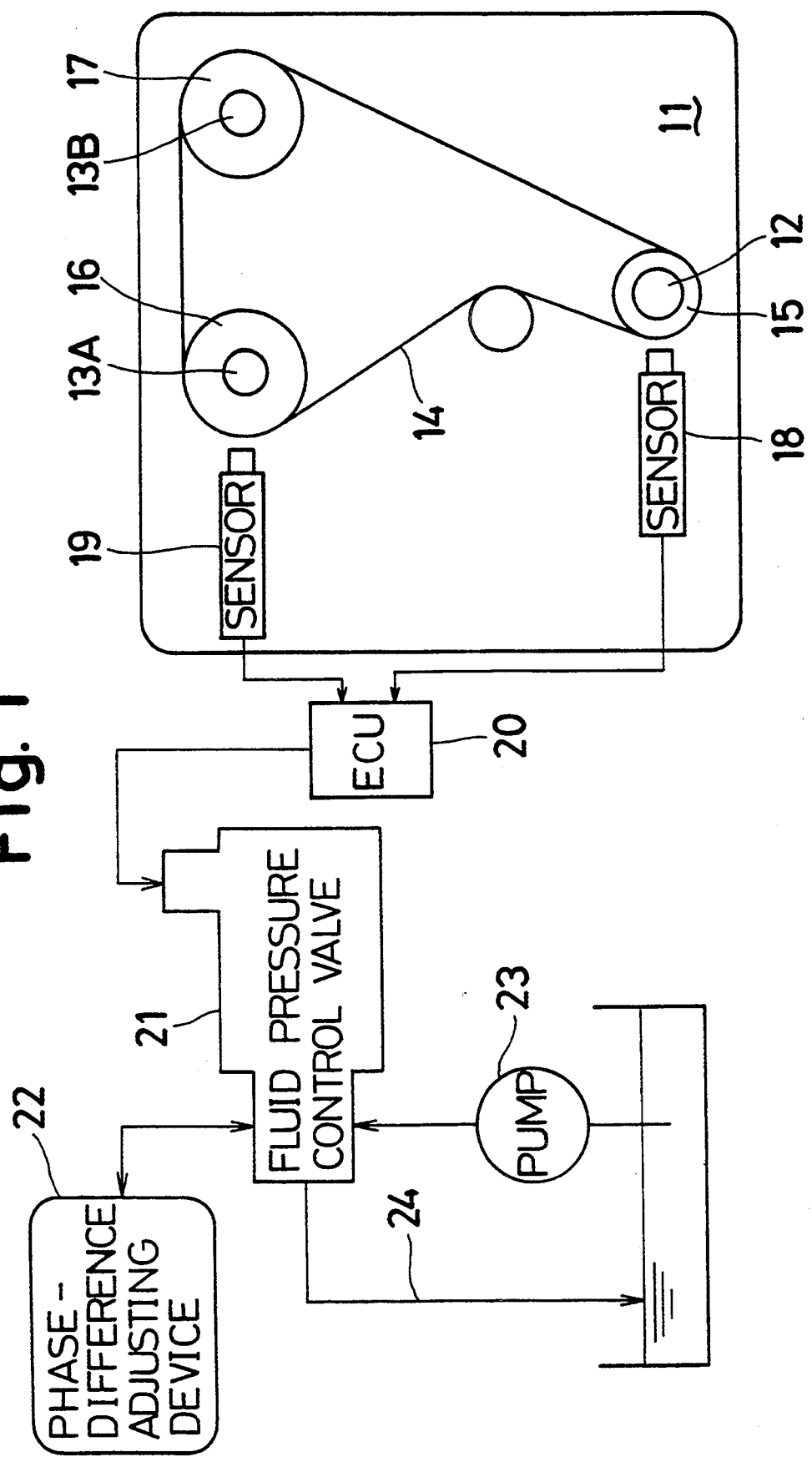
FIG. 1 is a diagram of a variable timing system in accordance with the present invention.
Figure 2:
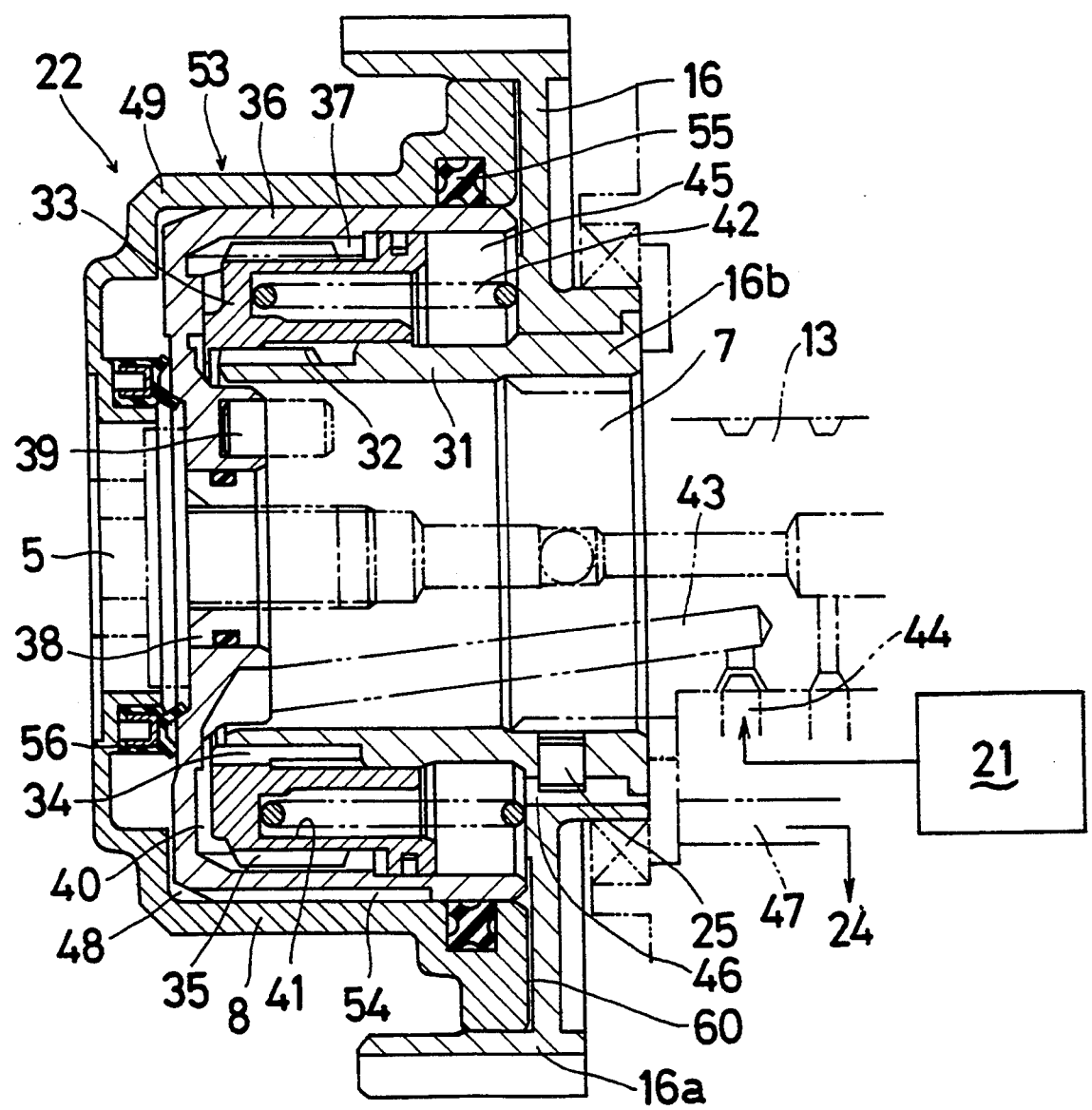
FIG. 2 is a cross-sectional view a phase-difference adjusting device used in a variable timing system shown in FIG. 1.

Referring first to FIGS. 1 and 2, and engine 12 includes a crank shaft 12 mounted thereon with a pulley 15 and serving for deriving therefrom a driving force, a first cam shaft 13A mounted thereon with a pulley 15 and operatively connected to a valve mechanism (not shown), and a second cam shaft 13B mounted thereon with a pulley 16 and operatively connected to another valve mechanism (not shown). A common belt 14 is tensioned on the pulleys 15-17. The angular position of the crank shaft 12 and the angular position of the cam shaft 13A are continually detected by a first sensor 18 and a second sensor 19, respectively. The resultant position signals are fed or inputted from the first sensor 18 and the second sensor 19, respectively, to an ECU or electronic control unit 20 which is in the form of a micro-processor or a CPU. Depending on these signals, the ECU 20 emits a control current to a fluid pressure control valve 21.

The fluid pressure control valve 21, as will be detailed later, is expected to control a fluid pressure to be supplied to or discharged from a phase-difference adjusting device 22, and is operated in such a manner that if a phase-difference is desired to change the fluid pressure control valve 21 supplies the fluid pressure to the phase-difference adjusting device 22 by establishing a fluid communication between a pump 23 and the phase-difference adjusting device 22 as well as if phase-difference is desired to remain as it is the fluid control valve 21 discharges the fluid pressure from the phase-difference adjusting device 22 by establishing a fluid communication between a drain circuit 24 and the phase-difference adjusting device 22.

As best shown in FIG. 2, the cam shaft 13 is provided at one end portion thereof with the phase-difference adjusting device 22 which is so designed as to change or adjust the rotation phase of the cam shaft 13. On the end portion of the cam shaft 13, there is so mounted the pulley 16 as to be movable relative to the cam shaft 13. The pulley 16 includes a first portion 16a and a second portion 16b which are so connected each other by a common pin 25 as to prevent a relative rotation therebetween. The second portion 16b of the pulley 16 has a boss 31 and a first helical spline 32 is provided on an outer surface of the boss 31. An inner surface and an outer surface of a piston 33 which is of a cylindrical shape are provided with a second helical spline 34 and a third helical spline 35, respectively. The second helical spline 34 is in meshing engagement with the first helical spline 32. A cup-shaped casing 36 is provided at its inner surface with a fourth helical spline 37 which is in meshing engagement with the third helical spline 35. The casing 36 is secured at its center portion to the cam-shaft 13 by a combination of a bolt 38 and a pin 39. Thus, the pulley 16 is in engagement with the piston 33 and is movable or rotatable relative thereto. The piston 33 is in engagement with the casing 36 and is movable or rotatable relative thereto.

The piston 33 is set to be reciprocated in the axial direction, in accordance with the engagement between the first helical spline 32 and the second helical spline 34 and the engagment between the third helical spline 35 and the fourth helical spline 37, within a space defined between the boss 31 of the pulley 16 and the casing 36. Within the space, at a left side of the piston 33, there is defined a pressure chamber 40, and a spring 42 is interposed between the pulley 16 and a convex groove 41 which is formed in a right side of the piston 33. The pressure chamber 40 is in fluid communication with the fluid pressure control valve 21 via a passage 43 in the cam-shaft 13 and a passage 44 in the engine 11. A space 45 within which the spring 42 is accommodated is in fluid communication with the drain passage 24 via a drain passage 46 in the cam-shaft 13 and a drain passage 47 in the engine 11.

Figure 3:
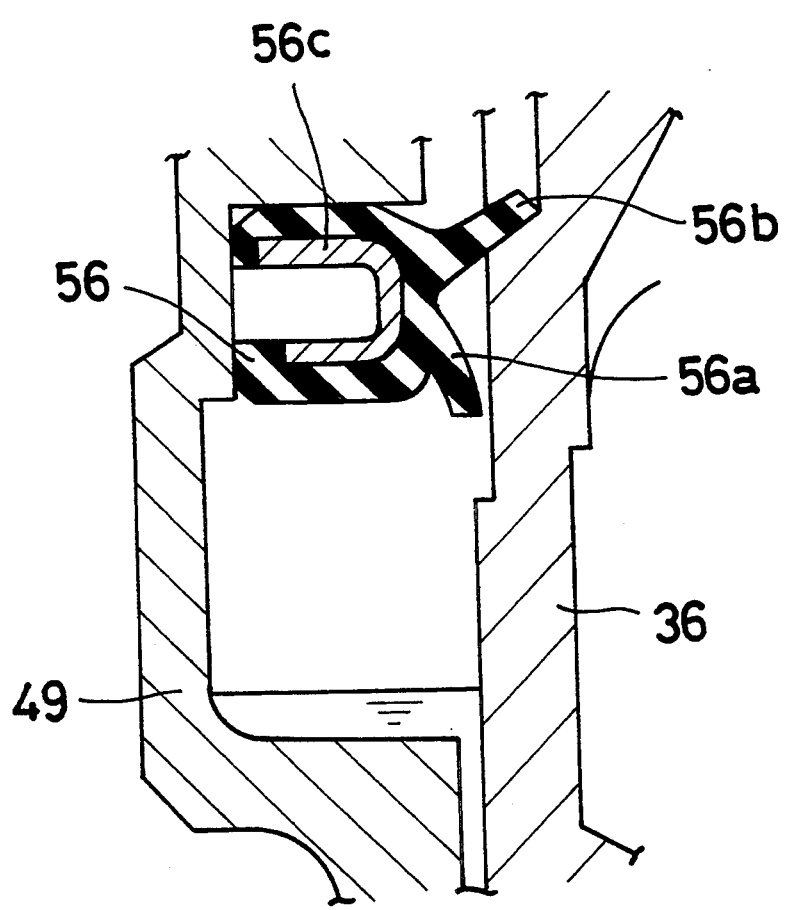
FIG. 3 is a cross-view of a damper which is a principal or substantial portion of a phase-difference adjusting device shown in FIG. 2.

Around the outer surface of the casing 36, there is rotatably mounted a cup-shaped cover 49 with a slight gap or clearance 48 within which an amount of viscous fluid is stored, and thus a damper 53 is constructed. A plurality of axially extended grooves 54 (only one is shown) is formed in the outer surface of the casing 36. The cover 49 is snugly fitted via a gasket 60 into the first portion 16a of the pulley 16. Between the outer side of the casing 36 and the inner side of the cover 49, there is disposed a first seal member or ring 55 having an X-shape in cross-section. The whole first seal member 55 is made of an elastic material such as a synthetic resin or a rubber. A second seal ring 56 is disposed between a left side of the casing 36 and a right side of the cover 49. These seal members 55 and 56 serve for the prevention of a leakage of viscous fluid. As best shown in FIG. 3, the second seal member 56 includes a metal core 56c formed into a substantially U-shaped configuration and an elastic portion with a first lip 56a having a fluid-tight function and a second lip 56b having a function of dust prevention. The elastic portion is made of an elastic material such as a synthetic resin or a rubber.

In operation, when the engine 11 is set in motion, the crank-shaft 12 is rotated and the the resultant rotation is transmitted via the belt 14 to the pulleys 16 and 17. Since the first cam-shaft 13A associated with the pulley 16 and the second cam-shaft 13B associated with the pulley 17 are in engagement with intake valves (not shown) and discharge valves (not shown), respectively, opening and closing control of each of the intake valves (not shown) and discharge valves is established. Thus, a mixture of air and fuel is supplied to each cylinder of the engine 11 and an exhaust gas is discharged therefrom.

The rotation phase-difference between the pulley 16 and cam-shaft 13 is commonly set to be kept at a value. Since the rotation range of the engine 11 varies from a low rotation range to a high rotation range, there is a suitable or optimum timing of the opening and closing the valve for each rotation range. Thus, this timing is set to be adjusted by the variable timing system depending on each rotation region.

In detail, when the ECU 20 is in receipt of an information form the first sensor 18 which indicates that the engine 11 is in a specific rotation range R1 such as an idling region or a high speed rotation region, the ECU 20 orders the fluid pressure control valve 21 not to supply the fluid pressure to the pressure chamber 40 in such a manner that the fluid communication is established between the drain passage 21 and the pressure chamber 40 in order to isolate the pressure chamber 40 from the pump 23. Thus, the phase-difference adjusting device 22 is at a position shown in FIG. 2 under which the piston 33 is being urged in the leftward direction by the spring 42 and therefore the pressure chamber 40 is at minimum in volume. Under such a situation, the rotation torque inputted to the pulley 16 from the belt 14 is transmitted to the cam-shaft 13A via the first helical spline 32, the second spline 34, the piston 33, the third helical spline 35, the fourth spline 37, and the casing 36. The resultant rotation torque makes the cam 25 to operate each opening and closing operation of each valve mechanism.

When the engine 11 becomes in another rotation region R2 such as a low speed rotation region or an intermediate speed rotation region, the ECU 20 commands the fluid pressure control valve 21 to establish the fluid communication between the pressure chamber 40 and the pump 23, which results in that the pressure chamber 40 is supplied with fluid pressure. Thus, the cup-shaped piston 33 is brought into a rightward movement in FIG. 2 against the biasing force of the spring 42, which brings the maximum volume of the pressure chamber 40. During this process, the third helical spline 35 and the fourth helical spline 37 make a relative rotation between the casing 36 and the cup-shaped piston 16 as well as the first helical spline 32 and the second helical spline 34 make a relative rotation between the pulley 16 and the cup-shaped piston 16. Thus, a relative rotation between the cam-shaft 13A and the pulley 16, and the cam-shaft 13 advances relative to the pulley 16 in rotation phase angle, which brings an advance of the timing of each opening and closing operation of the valve mechanism. In spite of a small amount of leakage of the fluid pressure from the pressure chamber 40 into the space 45, most of the fluid pressure in the pressure chamber 40 is expected to be drained immediately to the drain passage 24 through the passages 46 and 47.

If the rotation region of the engine 11 returns back to the rotation region R1, the ECU 20 orders the fluid pressure control valve 21 to connect the pressure chamber 40 to the drain passage 24 for draining the fluid pressure thereinto. Thus, the cup-shaped piston 33 is moved by the biasing action of the spring 42 in the leftward direction, which results in that the third helical spline 35 and the fourth helical spline 37 make a reverse relative rotation between the casing 36 and the cup-shaped piston 16 as well as the first helical spline 32 and the second helical spline 34 make a reverse relative rotation between the pulley 16 and the piston 33.

It is to be noted that in addition to the engine rotation speed at least one or more of a throttle opening, an engine temperature, an operation condition of an air conditioner and other information are expected to be considered, according to demand, by the ECU 20 for the control of the phase-difference adjusting device 22.

As is well known, regardless of the rotation region of the engine 11, the cam-shaft 13 receives a torque variation form a spring (not shown) which is in engagement with the valve. The positive component and the negative component of this torque act on the can-shaft 13 to advance and delay, respectively. Though the resultant torque variation attempts to generate undesirable matters such as noises at a backlash between the helical splines 32 and 34, and a backlash between the helical splines 35 and 37, such a drawback caused by a relative rotation between the casing 36 and the pulley 16 can be prevented by a damper effect established at the damper 53 which absorbs the torque variation such that the foregoing relative rotation affects the viscous fluid contained within the damper 53 to thereby generate a shearing force.

It is especially to be noted that while the engine 11 rotates at a high speed the temperature of the phase-difference adjusting device 22 is at a high. Thus, the viscous fluid and the air in the damper 53 are expanded, thereby increasing the pressure in the damper 53. However, as can be seen from FIG. 3, during this high speed rotation of the engine 11, the first lip 56a of the second sealing member 56 which has a fluid-tight seal is applied with a centrifugal force and therefore is moved away from the left side of the casing 36. The lip 56b of the second sealing member 56 is out of a fluid-tight function in original. Thus, the inner side of the damper 53 is brought into a substantially atmospheric pressure level, whereby unnecessary forces are not applied to the sealing members 55 and 56 and therefore a smooth or a less frictional relative rotation or between the casing 36 and the pulley 16 is established. As a result, a quick adjustment of the timing of the opening and closing the valve. In addition, the foregoing relative rotation with less friction enables a relatively low fluid pressure for moving the piston 33. In light of the fact that the fluid pressure for moving the piston 33 can be low, even though the discharging pressure of the pump 23 is low, a stable operation of the phase-difference adjusting device 22 can be assured.

The invention has thus been shown and described with reference to reference to a specific embodiment, however, it should be noted that the invention is in no way limited to the details of the illustrated structures but changes and modifications may be made without departing from the scope of the appended claims.

What is claimed is:

1. A variable valve timing system in an engine having a rotating camshaft comprising:
    an input pulley driven by the engine;
    a piston engaged with the input pulley so as to be displaceable in axial and angular directions relative thereto;
    a cup-shaped casing mounted on the piston so as to be relatively rotatable with respect to each other and rotatably fixed to the camshaft;
    a cup-shaped cover accommodating therein the cup-shaped casing with a clearance therebetween and connected to the input pulley;
    a damper containing an amount of viscous fluid disposed in the clearance;
    a first sealing member disposed at one end of the clearance; and
    a second sealing member disposed at the other end of the clearance and having a characteristic in that a fluid-tight function between the cup-shaped cover and the cup-shaped casing becomes less as a centrifugal force due to rotation of said input pulley increases.

2. A variable valve timing system in accordance with claim 1, wherein the second sealing member includes a lip portion, the cup-shaped casing includes a slant surface portion on which the lip portion of the second sealing member rests.

3. A variable valve timing system in accordance with claim 2, wherein the second sealing member is made of an elastic material.

4. A variable valve timing system in accordance with claim 3, wherein the elastic material is a rubber.

5. A variable valve timing system in accordance with claim 3, wherein the elastic material is a synthetic resin.

6. A variable valve timing system in accordance with claim 3 further comprising a core accommodated in the second sealing member.

7. A variable valve timing system in accordance with claim 3, wherein the second sealing member has a hollow portion therein which is open toward the cup-shaped cover.

8. A variable valve timing system in accordance with claim 7 further comprising a core fitted in the hollow portion of the second sealing member.

9. A variable valve timing system in accordance with claim 8, wherein the second sealing member is made of an elastic material and the core is made of a metal.

* * * * *